No. 673,317. Patented Apr. 30, 1901.
J. S. COLE & G. E. SWARTZ.
AUTOMATIC REVERSE CUT-OUT FOR ELECTRIC TRAVELING AND HOISTING CRANES.
(Application filed Aug. 14, 1900.)
(No Model.) 4 Sheets—Sheet 1.
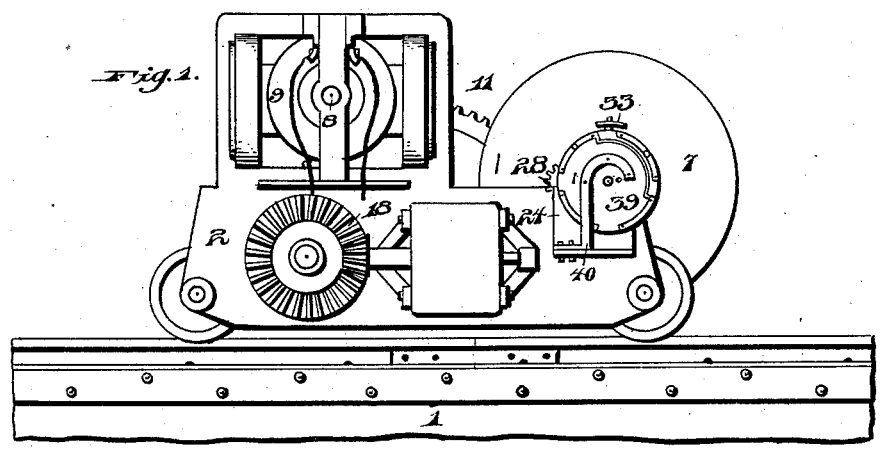
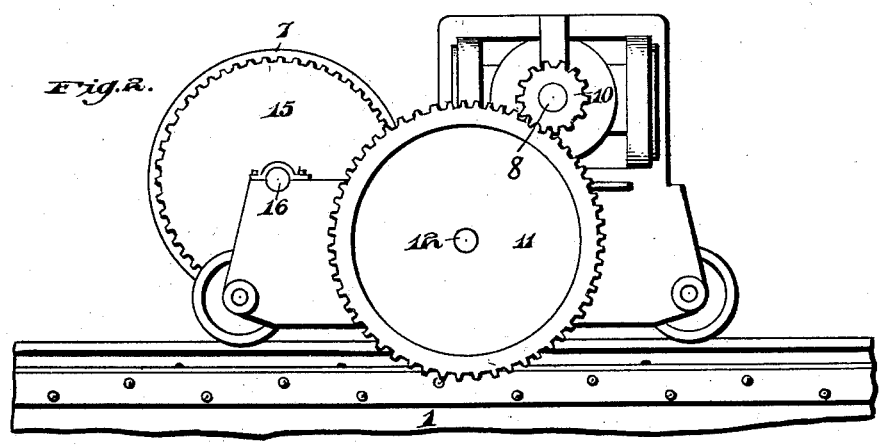
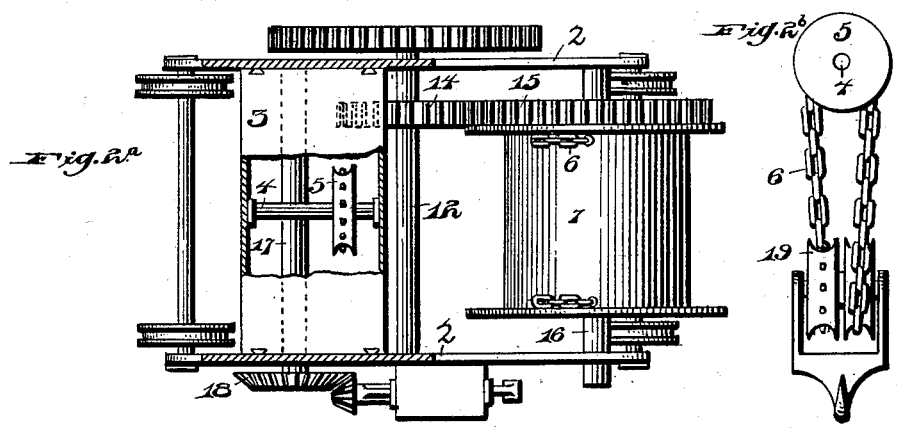
Witnesses:
Inventors.
J. S. Cole
G. E. Swartz
By
Att'ys No. 673,317. Patented Apr. 30, 1901.
J. S. COLE & G. E. SWARTZ.
AUTOMATIC REVERSE CUT-OUT FOR ELECTRIC TRAVELING AND HOISTING CRANES.
(Application filed Aug. 14, 1900.)
(No Model.) 4 Sheets—Sheet 2.
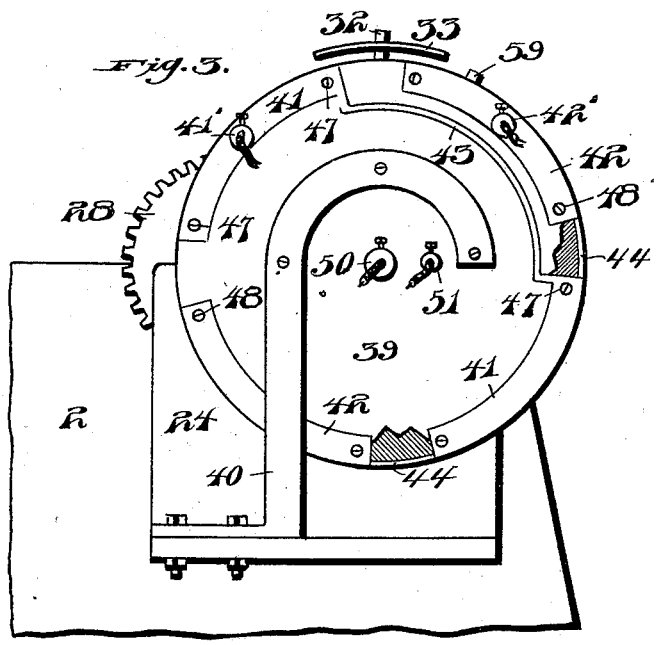
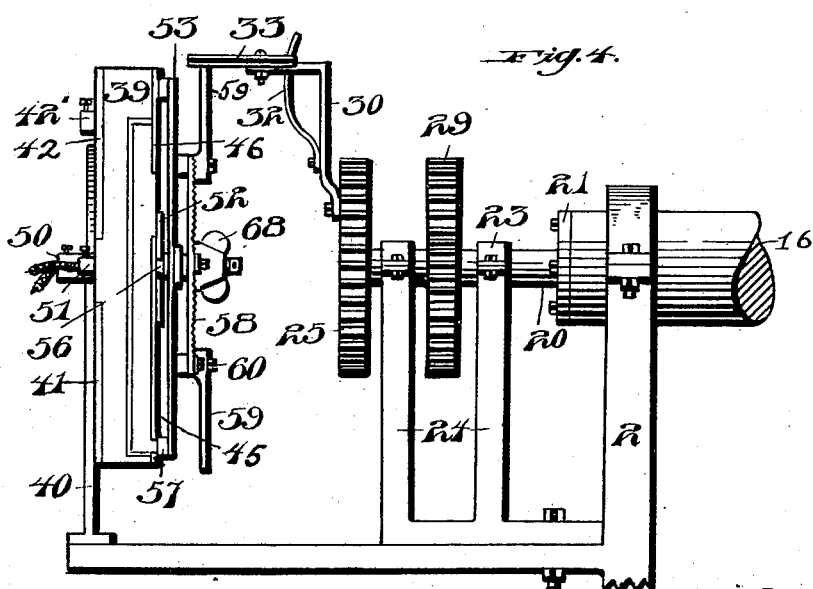

No. 673,317. Patented Apr. 30, 1901.
J. S. COLE & G. E. SWARTZ.
AUTOMATIC REVERSE CUT-OUT FOR ELECTRIC TRAVELING AND HOISTING CRANES.
(Application filed Aug. 14, 1900.)
(No Model.) 4 Sheets—Sheet 3.
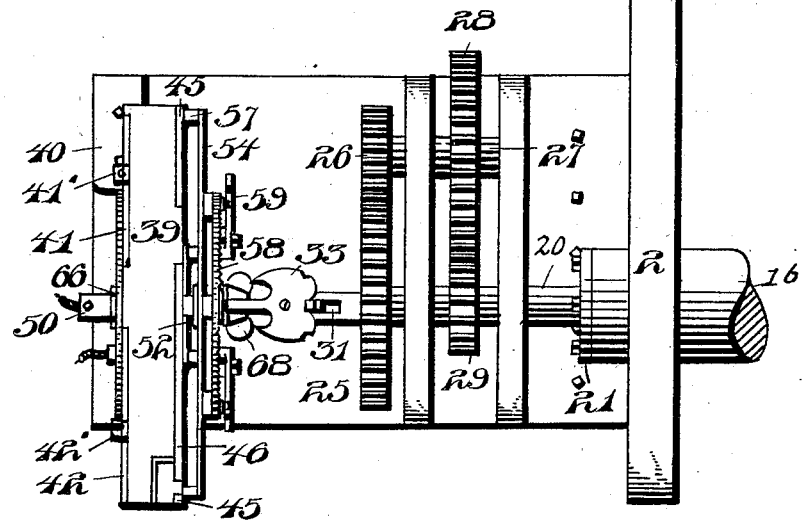
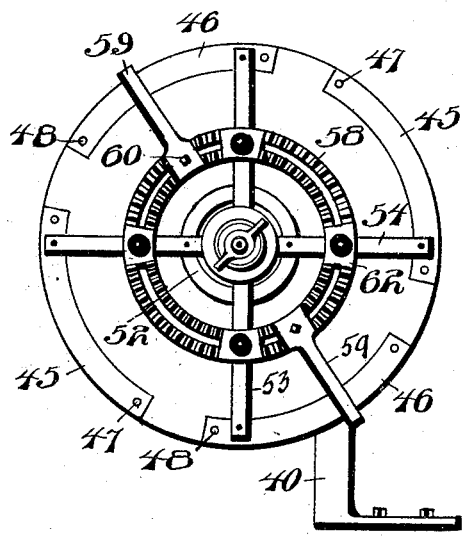
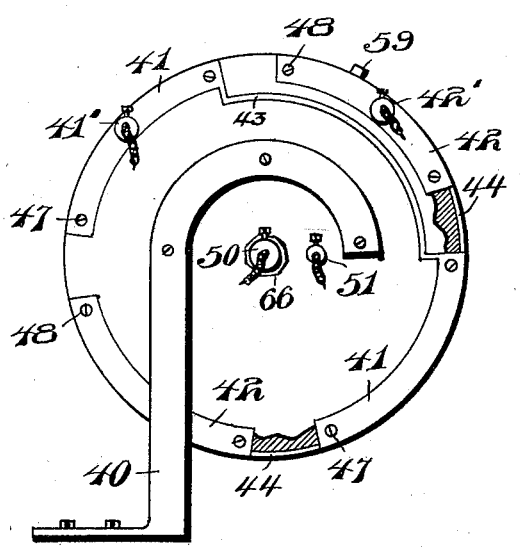

No. 673,317. Patented Apr. 30, 1901.
J. S. COLE & G. E. SWARTZ.
AUTOMATIC REVERSE CUT-OUT FOR ELECTRIC TRAVELING AND HOISTING CRANES.
(Application filed Aug. 14, 1900.)
(No Model.) 4 Sheets—Sheet 4.
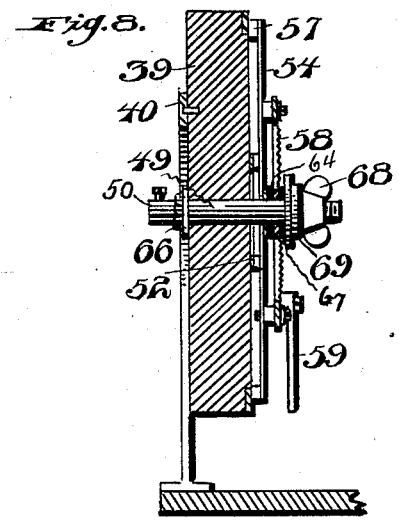
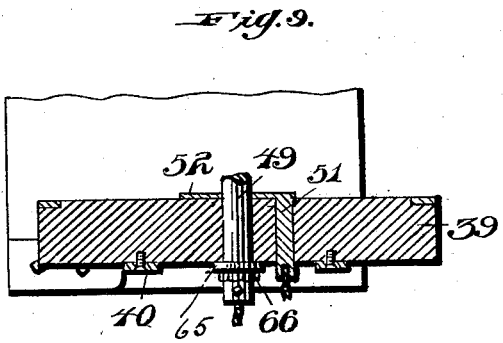
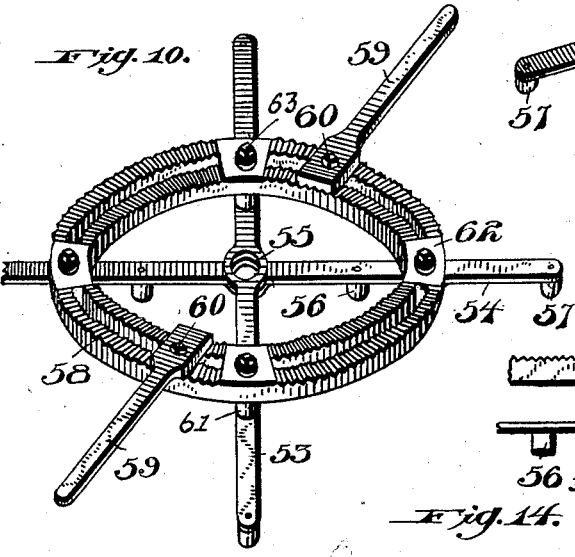
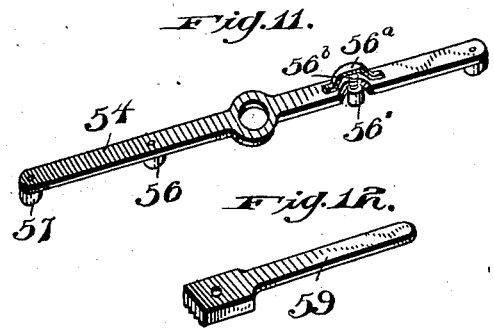
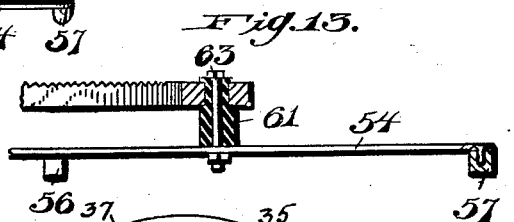
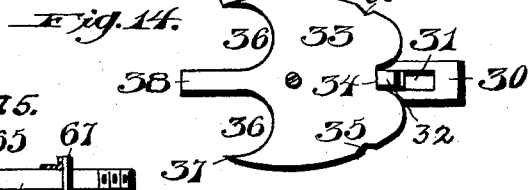
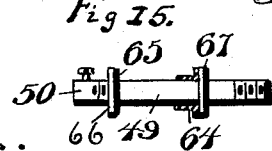
Witnesses:
Inventors.
J. S. Cole
G. E. Swartz
By
Atty's.
THE NORRIS PETERS CO., PHOTO-LITHO., WASHINGTON, D. C.

UNITED STATES PATENT OFFICE.

JACOB SNYDER COLE AND GEORGE E. SWARTZ, OF HOMESTEAD, PENNSYLVANIA.

AUTOMATIC REVERSE CUT-OUT FOR ELECTRIC TRAVELING AND HOISTING CRANES.

SPECIFICATION forming part of Letters Patent No. 673,317, dated April 30, 1901.

Application filed August 14, 1900. Serial No. 26,859. (No model.)

*To all whom it may concern:*

Be it known that we, JACOB SNYDER COLE and GEORGE E. SWARTZ, citizens of the United States of America, residing at Homestead, in the county of Allegheny and State of Pennsylvania, have invented certain new and useful Improvements in Automatic Reverse Cut-Outs for Electric Traveling and Hoisting Cranes, of which the following is a specification, reference being had therein to the accompanying drawings.

This invention relates to certain new and useful improvements in cut-outs, and may be particularly designated as an "automatic electric reverse cut-out," as it is adapted to be used in connection with electrically-operated cranes, hoists, and the like.

The object of the invention is, broadly, to afford protection to certain parts of the crane and prevent the same being damaged by the contact of the block and tackle engaging therewith as the same is carried upwardly and its chain wound upon the drum or shaft of the trolley. In the operation of cranes or hoists, especially those which are operated by electricity, it is frequently common for the operator to neglect to reverse the crane at the proper time, so as to prevent contact of the block and tackle with certain parts of the trolley. The upward movement of the tackle continuing, it is brought into contact with the trolley or the parts thereof, causing serious damage and loss, as well, perhaps, as the loss of lives. This device is adapted to be connected to the drum-shaft of the trolley, and when the tackle has reached a predetermined point is adapted to automatically cut out the current, so that the drum-shaft will cease to rotate, and further upward movement of the block and tackle will be prevented. When used in connection with hoists where it is desired to elevate or lower the block and tackle a predetermined distance only, the cut-out may be readily adjusted, so that when the predetermined height to which the block and tackle is to be elevated has been reached the reverse movement will be imparted to the drum and its shaft, so as to lower the block and tackle until the predetermined point to which it is to be lowered has been reached, when it will be again reversed, so as to impart an upward movement to the block and tackle, this being continued until the operator cuts out the operating-current.

Briefly described, the invention comprises a cut-out which is adapted to be suitably supported and carried by the trolley of a crane and the gearing which is adapted to be connected to the drum-shaft of the trolley and to be operated thereby for shifting the contact bars or arms of the cut-out, so as to cut out the current and cease the operation of the drum-shaft at the desired time in case the operator fails to reverse the same.

In describing the invention in detail reference is had to the accompanying drawings, forming a part of this specification, and wherein like numerals of reference indicate corresponding parts throughout the several views, in which—

Figure 1 is a side view of the trolley of a crane, showing our improved cut-out mounted thereon. Fig. 2 is a reverse view of the same. Fig. 2$^a$ is a horizontal sectional view of the trolley with the cut-out removed, showing the parts which it is desired to protect with our improved device. Fig. 2$^b$ is a detail view of a part of the block and tackle, showing the equalizing-wheel. Fig. 3 is a side elevation of the cut-out mounted in position on the trolley with the latter broken away. Fig. 4 is an end elevation of our improved cut-out in position on a trolley, showing the gearing for shifting the contact bars or arms employed for cutting out the current. Fig. 5 is a top plan view of the same. Fig. 6 is a detail side elevation of the inner face of the cut-out. Fig. 7 is a like view of the outer face thereof. Fig. 8 is a transverse vertical sectional view. Fig. 9 is a horizontal sectional view. Fig. 10 is a detail perspective view of the ratchet-circle, contact bars or arms, and the adjusting-levers of the cut-out. Fig. 11 is a detail perspective view of one of the contact bars or arms. Fig. 12 is a like view of one of the adjusting-levers. Fig. 13 is a horizontal sectional view of a part of the ratchet-circle and part of one of the contact-bars, showing the insulation between the ratchet-circle and contact-bars in enlarged section. Fig. 14 is a top plan view of the crowfoot carried by the shifting-lever. Fig. 15 is a detail plan view of the central contact-pin of the cut-out.

In the accompanying drawings, Figs. 1, 2, 2$^a$, and 2$^b$ have been shown in order to more clearly illustrate the objects of our invention and to show the parts of the trolley which are liable to injury and which we desire to protect by our invention, and we will therefore describe the parts of the trolley shown but briefly.

In the drawings, 1 indicates the girders upon which the trolley travels, this trolley comprising the side plates 2, which are connected together by the channel-beam 3, in which is journaled a shaft 4, having an equalizing-wheel 5 mounted thereon to receive a chain or cable 6, forming a part of the block and tackle, the ends of which chain are attached to the drum 7 of the trolley. A shaft 8 of the motor 9 carries on its one end a small pinion 10, which meshes with a larger pinion or gear 11, mounted on the corresponding end of a shaft 12, that is journaled in the sides of the trolley and has mounted thereon within the trolley a pinion or gear 14 to mesh with the gear 15, which is attached to the end of the drum or mounted on the drum-shaft 16. A shaft 17, which carries a beveled driving-gear 18, is also journaled in the sides of the trolley, passing through the channel bar or beam 3. The ends of the chain 6 are attached close to opposite ends of the drum 7, as shown in Fig. 2$^a$, and in Fig. 2$^b$ we have illustrated how this chain passes over the double pulleys 19 and over the equalizing-wheel 5. It will be evident that as the drum 7 continues to revolve the double pulley-block 19 will be drawn upwardly into contact with the trolley by reason of both ends of the chain winding thereon and brought into contact with the parts of the trolley just described and unless arrested cause damage thereto.

The gearing for operating the lever-arm that actuates the contact-bars of the cut-out consists of a shaft 20, which carries on its one end a disk 21, that is securely fastened to the end of the drum-shaft 16. This shaft 20 is journaled in bearings 23, carried by suitable standards 24, and carries on its free end a gear 25, which meshes with a smaller gear or pinion 26, mounted on the end of a short shaft 27, also journaled in the standards 24. This shaft carries between the standards 24 a gear 28, which meshes with a smaller gear or pinion 29, carried by the shaft 20 between the standards 24. The gear 25 has connected thereto on its outer face an angular or L-shaped lever-arm 30, the horizontally-extending member of which is provided with an oblong slot 31, through which extends a curved spring-arm 32, attached to the upright member of the arm 30, and the outwardly-extending member of this lever or arm 30 has pivotally secured to its outer face a crowfoot 33, having the notch 34 to receive the spring-arm 32, notches 35, and notches 36, the latter forming arms 37 and 38, the function of which will be hereinafter described.

The cut-out comprises an insulated disk 39, which is supported by a bracket 40, attached to its outer face and to a suitable point on the trolley, or other suitable supporting means may be employed than that shown. This disk has embedded in its outer face the two pairs of segments 41 and 42, the former connected together by a bar 43 and the latter by a bar 44, embedded in the periphery of the disk 39. This disk also has embedded in its inner face the two pairs of segments 45 46, the pair 45 being connected to the pair 41 on the outer face of the disk by contact-screws 47 and the pair 46 being connected to the pair 42 by like contact-screws 48. A binding-post 41' is carried by one of the segments 41 for connecting one of the wires thereto, and a like binding-post 42' is carried by one of the segments 42 for connecting the other wire thereto.

The disk 39 has arranged therein a central post 49, the outer end of which forms the binding-post 50, making the one terminal of the feed or current wire, the other terminal consisting of a post 51, extending through the disk adjacent to the central post 49 and having a contact circle or plate 52 on its inner end, through which the central post 49 passes. Mounted upon the central post or pin 49 is a pair of contact-bars 53 54, which cross each other at right angles and have an insulated washer 55 at their hubs to insulate the one bar from the other. One of these bars carries on its inner face a pair of contacts 56, which are always in engagement with the contact circle or plate 52, and on the same face at each end the bars each carry like contacts 57, which are adapted to engage with the segments 45 and 46 on the inner face of the disk during the operation of the crane, and when the contact-bars are moved by the lever 30 and crowfoot 33 these end contacts will engage with the insulated disk between the segments on the inner face of the disk and break the circuit to discontinue the operation of the trolley. These contacts may be of the form shown, comprising the contact pin or block carried by a smaller pin secured in the contact-bar, or they may be made as shown in Fig. 11, wherein one of the same is shown of the same relative diameter throughout, as at 56', with a cap 56$^a$ secured to the outer face of the contact-bar and a spring 56$^b$ interposed between the inner face of the cap and the contact to hold the latter in engagement with the contact circle or plate for the inner contacts, and with the segments for the outer contacts in case such a construction should be employed for all of these contacts. These contact-bars carry a ratchet-circle 58, circumferentially slotted, and in these slots is mounted the adjusting-levers 59 by means of set-screws 60 or ordinary bolt and nut. These adjusting-levers are in contact or in circuit with the ratchet-circle, while the contact-bars are insulated therefrom by insulated sleeves 61, placed between the integral blocks 62 of the ratchet-circle and the contact-bars and secured thereto by bolts 63, passing through the insulation-sleeves or in other desired manner. The adjusting-levers 59 are of such length as to pass beyond the periphery of the disk 39, and consequently be engaged by the crowfoot 33 as it revolves, and move the contact-bars together with the ratchet-circle and either cut out the circuit or reverse the operation of the winding-drum, as will be further explained. The under contact-bar 54 is insulated from the central post or pin 49 by mounting on the same a sleeve of insulated material 64, this post or pin being secured rigidly in position by a washer 65, which may be held in position by a suitable jam-nut 66, and at the other side of the disk by a washer 67, insulated by the insulation 64, the upper contact-bar being mounted directly upon this shoulder or washer 67, with a winged nut 68 mounted on this end of the post or pin and insulated therefrom by a washer of insulation 69.

We will now proceed to describe the operation of our automatic cut-out as the same operates in connection with the cranes usually employed at the present time. Assuming that all parts are in position, the shaft 20 being connected up to the drum-shaft 16 and this shaft is revolving, the contact-bars being in the position shown in Fig. 6 of the drawings, or, in other words, adjacent to the one end of the segments 45 and 46, as the gearing connected to the drum-shaft moves the arm 30 in a circular manner it brings the arm 38 of the crowfoot 33 into engagement with one of the adjusting-levers 59, the spring 32 engaging in the notch 34 and holding this crowfoot in the position as shown in Fig. 14, moving the contact-bars, ratchet-circle, and adjusting-levers around the disk until the contacts 57 are moved off the segments 45 and 46 onto the portion of the insulated disk between the segments, at which time the circuit is broken and the trolley ceases to move. The cutting out of the circuit, and consequent ceasing of the movement of the trolley and rotation of the drum, prevents the block and tackle from being drawn up into the trolley and the parts thereof damaged, as would be the case were the block and tackle permitted to continue to move upward after the block 19 has come into a position in close proximity to the shaft 12 of the trolley or other vital parts thereof. When the current is thus cut out and damage prevented to the trolley, the operator handling the crane cuts out his current at the controller where he is stationed and proceeds up to the trolley and moves the contact-bars backward, so as to bring the same again into engagement or contact with the segments, which he may do without danger, owing to the circuit having been cut out at his controller before he leaves his station. As the block and tackle is now at the upper limit of its movement and the operator when he again descends to the controller must lower the same, it is necessary that the projecting arm 38 of the crowfoot be set so as to again be in position to engage with one of the adjusting-levers, so as to again cut out the current and cease the operation of the trolley in case the operator should forget to reverse his controller in time. For this reason we provide the notches 35 and the arms 37. The operator compresses the spring 32 and swings the crowfoot upon its pivot, so that the spring-arm 32 may drop into one of the notches 35 (according to the direction in which the crowfoot is turned on its pivot) and be held in this position until the operator cuts in the current at the controller and begins the reverse or downward movement of the block and tackle. The arm 38 when the crowfoot is in this position is turned inwardly out of the way of the adjusting-levers, and the projecting arm 37 comes in contact with the adjusting-lever which is adjacent thereto at this time and swings the crowfoot around on its pivot. After the arm 38 has passed the adjusting-lever the spring-arm 32 again springs into the notch 34, and the device is again set so as to engage with the adjusting-lever in case the operator forgets to reverse the operating mechanism in time to prevent the block and tackle engaging with the vital parts of the trolley. This operation as described is particularized to the adaptation of the device in connection with a crane. When a hoist is used, such as is employed for elevating to a certain distance only and lowering to a certain distance only, the same mechanism or elements are employed, with the exception that in such use the segments on the inner face of the disk would be so arranged and connected to the electrical circuit that upon the contacts being moved off the one pair of segments when the upper limit of the movement of the block and tackle has been reached onto the opposite pair of segments the movement of the drum would be reversed and the block and tackle would be lowered to the limit of its movement, where it would be again shifted or moved to the other pair of segments, and this operation continued indefinitely as long as the operator did not cut out the current at the controller.

The time at which the contact-arms are moved either to bring the contacts carried thereby onto the insulated disk or to shift the contacts from one pair of segments to the other pair, as in the use of the hoist, is regulated by the adjustment of the arms or levers 59 around the ratchet-circle, the levers being toothed, so as to engage with the ratchet of the circle and be held firmly in place, as will be readily understood.

It will be observed that in the construction of a device of this nature various changes may be made in the details of construction without departing from the general spirit of our invention.

Having thus fully described our invention, what we claim as new, and desire to secure by Letters Patent, is—

1. In a device of the character described, an insulated disk, segments mounted on both faces of said disk and connected together, a central contact-post carried by said disk and to which one of the circuit-terminals is connected, a contact circle or plate mounted on the inner face of the disk and to which the other circuit-terminal is connected, contact-bars carried by said central post and provided with contacts to engage with the segments on the inner face of the disk and with the contact-circle, a ratchet-circle carried by said bars, adjusting-levers carried by said circle, and means for supporting said disk, combined with means adapted to engage with said adjusting-levers and shift the contacts of the contact-bars into engagement with the disk itself to break the electrical circuit, substantially as described.

2. The combination with the trolley of an electrically-operated crane, of a cut-out supported from the trolley and comprising an insulated disk, contact-segments mounted on both faces of said disk and connected together, a contact-post carried by said disk and to which one of the circuit-terminals is connected, a contact-circle carried by said disk and to which the other circuit-terminal is connected, contact-bars mounted on the contact-post for engagement with the segments on the inner face of the disk, a ratchet-circle carried by said bars and insulated therefrom, and means on said trolley for moving the contact-bars from engagement with the segments into engagement with the disk to break the electrical circuit, substantially as described.

3. In combination with the trolley of an electrically-operated crane, a cut-out supported from the trolley and comprising an insulated disk, contact-segments mounted on the inner and on the outer face of said disk and connected together, contact-bars carried by the disk and provided with contacts to engage the segments on the inner face of the disk, a pair of adjusting-levers, and means on said trolley for engagement with said levers whereby the contacts of the contact-bars are shifted from engagement with the segments on the inner face of the disk and the electrical circuit broken, substantially as described.

4. In combination with the trolley of an electrically-operated crane, and gearing connected to the drum-shaft of the trolley, a cut-out comprising an insulated disk, contacts carried on the inner and outer faces of said disk and connected together, a contact-post carried by the disk and to which one of the circuit-terminals is connected, a contact-plate carried by the disk and to which the other circuit-terminal is connected, contact-bars carried by the disk, a ratchet-circle carried by said bars and insulated therefrom, adjusting-levers carried by the ratchet-circle, and means connected to the gearing attached to the drum-shaft for engagement with the adjusting-levers to move the contact-bars out of engagement with the contacts on the inner face of the disk and break the electrical circuit, substantially as described.

5. In combination with the trolley of an electrically-operated crane, an automatic cut-out supported from the trolley and comprising an insulated disk with contacts on the inner and outer face thereof, said contacts connected together, a pair of contacts to which the two terminals of the circuit are connected, contact-bars carrying contacts for engagement with the contacts on the inner face of the disk, and means connected to the drum-shaft of the trolley for actuating the contact-bars to move the contacts carried by the latter out of engagement with the contacts on the inner face of the disk to break the electrical circuit, substantially as described.

6. In a crane, the combination with the hoisting mechanism and the trolley, of an automatic cut-out adapted to be operated by the drum-shaft of the trolley and comprising an insulated disk supported from the crane, contacts on the inner and outer faces of said disk, said contacts being connected together, contacts carried by the disk and to which the circuit-terminals are connected, contact-bars carried by the disk for engagement with the contacts on the inner face of the disk, a ratchet-circle carried by said contact-bars, adjusting-levers carried by said ratchet-circle, and means connected to the drum-shaft of the trolley for moving the contact-bars to break the electrical circuit, substantially as described.

7. In a crane, the combination with the trolley, of an automatic electric cut-out having contact-segments, contact-bars having contacts for engagement with the segments, a ratchet-circle carried by the contact-bars, adjusting-levers carried by said ratchet-circle, and means connected to the drum-shaft of the trolley whereby the contacts of the contact-bars are moved out of engagement with the contact-segments and the electrical circuit broken, substantially as described.

8. In a crane, the combination with the trolley thereof, of an automatic electric cut-out having an insulated disk, contacts mounted on the inner face of said disk, contact-bars carried by the disk and insulated therefrom, said bars carrying contacts for engagement with the contacts on the inner face of the disk, a ratchet-circle carried by the contact-bars and insulated therefrom, adjusting-levers carried by said ratchet-circle, said levers being adjustable, and means for engagement with the adjusting-levers to actuate the ratchet-circle and contact-bars to move the contacts carried by the latter out of engagement with contacts on the inner face of the disk to break the electrical circuit, substantially as described.

9. In an electrically-operated crane, the combination with the trolley, of an electric cut-out having contact-segments, contact-bars having contacts for engagement with said segments, a gearing connected to the drum-shaft of the trolley, a spring-held crowfoot supported from said gearing, and means connected to the contact-bars for engagement with said crowfoot whereby the contacts of said bars are moved out of engagement with the contact-segments, as and for the purpose described.

10. The combination in an electrical cut-out of an insulated disk, contacts on the inner and outer face of said disk, said contacts connected together, contacts carried by the disk and to which the circuit-terminals are connected, contact-bars carried by the disk for engagement with the contacts on the inner face of the disk, gearing connected to the drum-shaft of the trolley, and a crowfoot carried by said gearing for moving the contact-bars out of engagement with said contacts on the inner face of the disk to break the electrical circuit, substantially as described.

11. In an electrical cut-out for cranes and the like, an insulated disk, contact-segments mounted on both faces of said disk and connected together, a central contact-post carried by said disk with one of the circuit-terminals connected thereto, a contact-plate mounted in the disk with the other circuit-terminal connected thereto, contact-bars mounted on the central contact-post for engagement with the contact-segments on the inner face of the disk and for engagement with the contact-plate, and a pair of adjusting-levers connected to the contact-bars but insulated therefrom, combined with means adapted to engage the adjusting-levers to move the contact-bars out of engagement with the contact-segments on the inner face of the disk, as and for the purpose described.

12. In an electric cut-out, an insulated disk having contacts on both faces thereof and connected together, separate contacts to which the terminals of the electric circuit are connected, contact-bars having contacts for engagement with the contacts on the inner face of the disk, adjusting-levers connected to the contact-bars, a gearing, and means intermediate the gearing and adjusting-levers for engagement with the latter to move the contact-bars to break the electrical circuit, substantially as described.

In testimony whereof we affix our signatures in the presence of two witnesses.

JACOB SNYDER COLE.
GEORGE E. SWARTZ.

Witnesses:
JOHN NOLAND,
H. C. EVERT.